United States Patent [19]
Higuchi et al.

[11] Patent Number: 6,001,891
[45] Date of Patent: *Dec. 14, 1999

[54] BIODEGRADABLE ALIPHATIC POLYESTER ELASTOMER AND PREPARATION PROCESS OF SAME

[75] Inventors: Chojiro Higuchi; Masatoshi Takagi; Takeshi Kashima; Masanobu Ajioka; Yuji Terado, all of Kanagawa-ken, Japan

[73] Assignee: Mitsui Chemicals, Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/865,128

[22] Filed: May 29, 1997

[30] Foreign Application Priority Data

Jun. 16, 1996 [JP] Japan ..................................... 8-153988
Nov. 7, 1996 [JP] Japan ..................................... 8-295044

[51] Int. Cl.$^6$ .............................. C08J 3/28; C08G 63/52; C08F 2/46; C08L 67/06
[52] U.S. Cl. .......................... 522/104; 523/500; 528/303; 528/306
[58] Field of Search ..................................... 528/306, 303; 523/500; 522/104

[56] References Cited

U.S. PATENT DOCUMENTS

| | | | |
|---|---|---|---|
| 2,871,420 | 1/1959 | Minter et al. ............................ | 528/303 |
| 3,932,319 | 1/1976 | Clendinning et al. ................... | 525/177 |
| 4,343,932 | 8/1982 | Prooi et al. .............................. | 523/500 |
| 4,888,413 | 12/1989 | Domb ..................................... | 528/272 |
| 5,138,023 | 8/1992 | Sartori et al. ........................... | 528/306 |
| 5,401,796 | 3/1995 | Kashima et al. ........................ | 524/706 |
| 5,637,631 | 6/1997 | Kitada et al. ........................... | 528/272 |

FOREIGN PATENT DOCUMENTS

| | | |
|---|---|---|
| 0618249 | 10/1994 | European Pat. Off. . |
| 0712880 | 5/1996 | European Pat. Off. . |
| 7-133333 | 5/1995 | Japan . |

OTHER PUBLICATIONS

PN JP 6–298920 A (Showa Highpolymer Co. Ltd.) *abstract*.

*Primary Examiner*—Tae Yoon
*Attorney, Agent, or Firm*—Burns, Doane, Swecker & Mathis, L.L.P.

[57] ABSTRACT

A biodegradable aliphatic polyester elastomer which has rubber-like elasticity, hardness of 80 or less in accordance with ASTM D 676-58T, and elastic modulus from $1 \times 10^5$ Pa to $1 \times 10^8$ Pa at 25° C., and decomposes with ease in the natural environment, under composting conditions or under hydrolysis conditions. The biodegradable aliphatic elastomer can be obtained by crosslinking aliphatic polyester containing aliphatic unsaturated polybasic acid as a polymer constituting ingredient and having a weight average molecular weight of 15,000 or more.

12 Claims, 1 Drawing Sheet

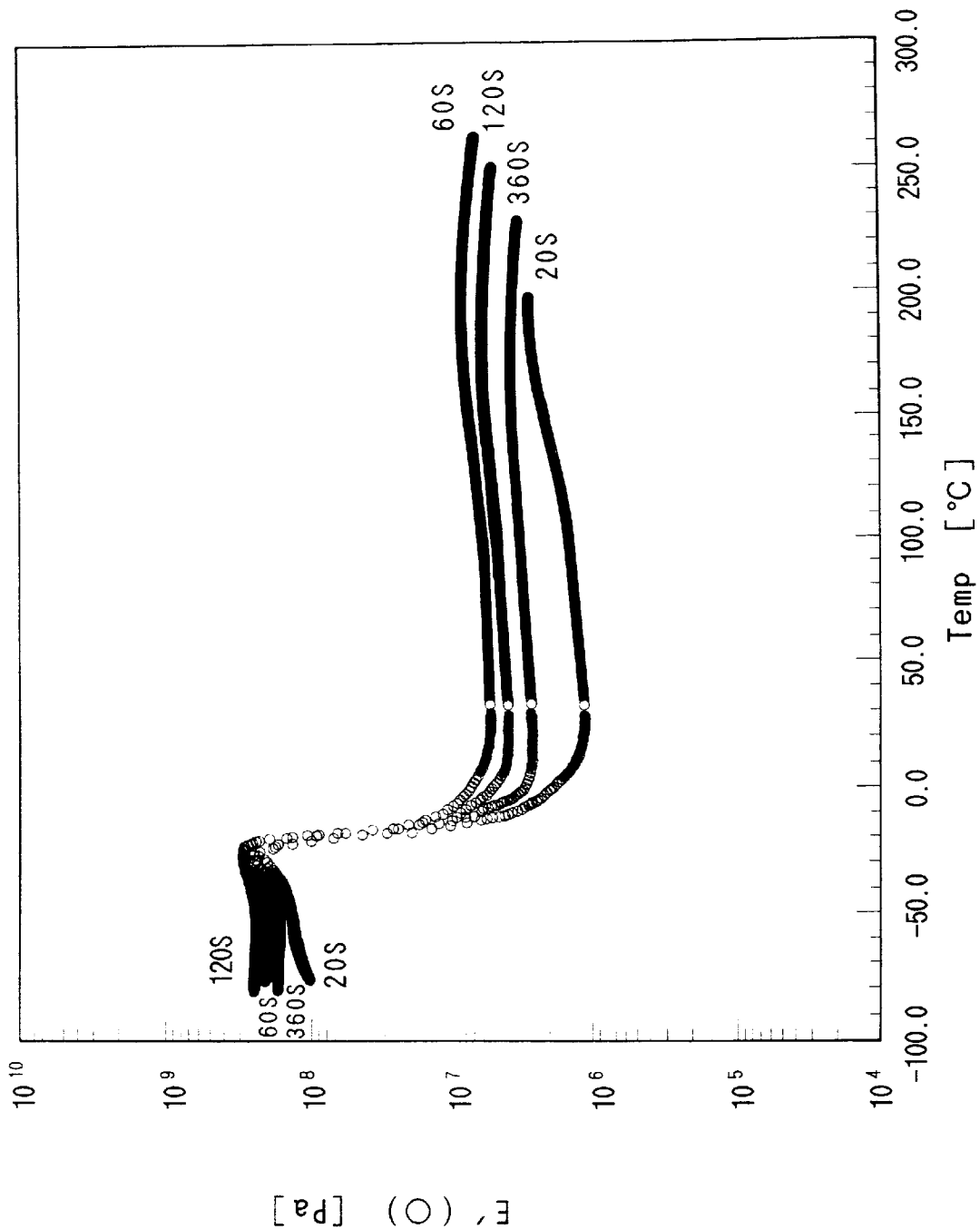

BIODEGRADABLE ALIPHATIC POLYESTER ELASTOMER AND PREPARATION PROCESS OF SAME

BACKGROUND OF THE INVENTION AND RELATED ART

1. Field of the Invention

The present invention relates to a biodegradable aliphatic polyester elastomer. The biodegradable elastomer of the invention is prepared by crosslinking aliphatic polyester containing aliphatic unsaturated polybasic acid as a polymer constituting ingredient.

The biodegradable elastomer of the invention can provide formed articles and workpieces by utilizing the favorable properties of the elastomer.

2. Related Art of the Invention

As well known in the art, there are several processes for preparing a high molecular weight aliphatic polyester having a weight average molecular weight of 15,000 or more from aliphatic polyhydric alcohol and aliphatic polybasic acid.

U.S. Pat. No. 5,401,796 has disclosed a process for preparing aliphatic polyester having a weight average molecular weight of 15,000 or more, comprising conducting a heat dehydration reaction of aliphatic polyhydric alcohol or a mixture thereof with aliphatic polybasic acid or a mixture thereof, or an oligomer of these ingredients in a reaction mixture containing an organic solvent.

According to the process, high molecular weight aliphatic polyester thus obtained contains no impurity, is in a low grade of coloration, and has strength which is sufficient for formed items such as films and filaments.

However, the patent has disclosed aliphatic saturated polyester alone and no disclosure has been found at all on aliphatic unsaturated polyester or a biodegradable elastomer which differs in chemical properties.

U.S. Pat. No. 4,888,413 has disclosed a poly(propylene glycol fumarate) composition having a weight average molecular weight of 500–3,000.

The object of the art is to provide a composition which is specified in a terminal group ratio, weight average molecular weight and number average molecular weight, has improved mechanical properties and biodegradability, has high reproducibility, and is useful for biomedical applications such as bone cement.

Further, Japanese Laid-Open Patent Hei 7-133333 has disclosed a preparation process of biodegradable high molecular weight aliphatic polyester, comprising mixing aliphatic unsaturated polyester having a weight average molecular weight of 30,000 or more with polyester comprising 1 equivalent or more of polymerizable unsaturated group for 100 equivalents of terminal group and conducting copolymerization of unsaturated bonds in the mixture in the presence of organic peroxide.

According to the process, a biodegradable high molecular weight aliphatic polyester thus obtained has sufficient physical properties for preparing various formed items, can steadily increase the weight average molecular weight as compared with the number average molecular weight and can restrict scattering of viscosity.

However, these prior arts have no disclosure at all on the biodegradable elastomer.

SUMMARY OF THE INVENTION

One object of the present invention is to provide a biodegradable elastomer which can decompose in the natural environment, under composting conditions or under hydrolyzable conditions and further has rubber elasticity similar to natural rubber, synthetic rubber and silicone rubber which have been used conventionally.

As a result of investigating preparation of high molecular weight aliphatic polyester comprised of aliphatic polyhydric alcohol and aliphatic polybasic acid, the present inventors have found that an elastomer can be obtained by preparing high molecular weight aliphatic polyester having an unsaturated bond in the molecule and crosslinking said aliphatic polyester. Thus the present invention has been completed.

For example, unsaturated polyester having a weight average molecular weight of 179,000 is obtained by conducting a heat dehydration reaction of a mixture of succinic acid and fumaric acid in a molar ratio of 9:1 with diethylene glycol in the presence of a catalyst in an organic solvent. Successively an initiator is added to the unsaturated polyester and cured with an ultraviolet curing apparatus to provide a formed article having rubber elasticity.

The present invention can be specified by the items described (1)–(13) below.

(1) A preparation process of a biodegradable elastomer comprising crosslinking aliphatic polyester containing aliphatic unsaturated polybasic acid as a polymer constituting ingredient and having a weight average molecular weight of 15,000 or more.

(2) The preparation process of a biodegradable elastomer according to (1), wherein the aliphatic polyester containing aliphatic unsaturated polybasic acid is obtained by conducting a heat dehydration reaction of one or more ingredient (A) selected from the group consisting of:

(a1) aliphatic polyhydric alcohol and aliphatic unsaturated polybasic acid, (a2) aliphatic unsaturated oligoester, and (a3) aliphatic unsaturated polyester, with one or more ingredient (B) selected from the group consisting of:

(b1) aliphatic polyhydric alcohol and aliphatic saturated polybasic acid, (b2) aliphatic saturated oligoester, and (b3) aliphatic saturated polyester, in an organic solvent, in the presence of a catalyst, while removing from the reaction mixture a portion of the organic solvent comprising generated water and/or excess monomer and charging to the reaction mixture an additional organic solvent having a less or equal content of moisture and/or the monomer as compared with the organic solvent removed.

(3) The preparation process of a biodegradable elastomer according to (1), wherein the aliphatic polyester is an amorphous polymer having a glass transition temperature of 25° C. or less.

(4) The preparation process of a biodegradable elastomer according to (1), wherein the aliphatic polyester is a crystalline polymer having a melting point of 25° C. or less.

(5) The preparation process of a biodegradable elastomer according to (1), wherein the aliphatic unsaturated polybasic acid is one or more ingredients selected from the group consisting of fumaric acid, maleic acid, itaconic acid, citraconic acid and anhydride of these acids.

(6) The preparation process of a biodegradable elastomer according to (1), wherein the aliphatic polyester comprises as a constitutional ingredient an ethylene glycol polymer represented by the formula (1);

  (1)

wherein n is an integer of 2–10.

(7) The preparation process of a biodegradable elastomer according to (6), wherein n is an integer of 2 or 3.

(8) The preparation process of a biodegradable elastomer according to (1), wherein the crosslinking is progressed by thermal polymerization.

(9) The preparation process of a biodegradable elastomer according to (1), wherein the crosslinking is progressed by photo polymerization.

(10) The biodegradable elastomer obtained by the preparation process of (1).

(11) The biodegradable elastomer according to (10), wherein the elastomer has hardness of 80 or less evaluated by the hardness test specified in ASTM D 676-58T.

(12) A biodegradable aliphatic polyester elastomer which is obtained by crosslinking aliphatic polyester comprising an unsaturated bond and has an elastic modulus from $1 \times 10^5$ Pa to $1 \times 10^8$ Pa at 25° C.

(13) A biodegradable aliphatic polyester elastomer having an elastic modulus from $1 \times 10^5$ Pa to $1 \times 10^8$ Pa at 25° C.

BRIEF DESCRIPTION OF THE DRAWINGS

FIG. 1 illustrates a viscoelasticity chart of the biodegradable elastomer of the invention obtained in Example 1.

E' is storage elasticity.

20 s, 60 s, 120 s and 360 s individually illustrate curing by irradiating for 20 sec, 60 sec, 120 sec and 360 sec.

DETAILED DESCRIPTION OF PREFERRED EMBODIMENTS

The biodegradable elastomer of the invention can be obtained by crosslinking aliphatic polyester containing aliphatic unsaturated polybasic acid as a polymer constituting ingredient and having a weight average molecular weight of 15,000 or more.

The aliphatic polyester which contains aliphatic unsaturated polybasic acid as a polymer constituting ingredient and is used for the invention can be obtained by polycondensation of aliphatic polyhydric alcohol with polybasic acid such as aliphatic unsaturated polybasic acid or a mixture of aliphatic unsaturated polybasic acid and aliphatic saturated polybasic acid. Further, aliphatic hydroxycarboxylic acid can be used as a polymer constituting ingredient.

The aliphatic unsaturated polybasic acids which can be used for the invention are preferably dibasic acids and include, for example, fumaric acid, maleic acid, maleic anhydride, itaconic acid, itaconic anhydride, citraconic acid and citraconic anhydride.

The amount of unsaturated polybasic acid in the invention is generally 0.1–20% by mole for polybasic acid used, preferably 0.5–10% by mole, more preferably 1–5% by mole.

Aliphatic saturated polybasic acids which can be used are preferably dibasic acids and include, for example, oxalic acid, malonic acid, succinic acid, glutaric acid, adipic acid, pimelic acid, suberic acid, azelaic acid, sebacic acid and anhydrides of these acids. Further, a small amount of butanetetracarboxylic acid and other polybasic acids having a functionality of three or more can be contained in the above enumerated acids.

Aliphatic polyhydric alcohols which can be used for the invention are preferably bifunctional alcohols, and include, for example, ethylene glycol, diethylene glycol, triethylene glycol, polyethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol and polytetramethylene glycol. Further, glycerol, trimethylolpropane and other aliphatic alcohols having a functionality of three or more can be contained in a small amount. In these aliphatic polyhydric alcohols, preferred alcohols are polymers of ethylene glycol represented by the formula (1) below;

wherein n is an integer of 2–10.

Diethylene glycol and triethylene glycol are preferably used in particular.

Exemplary aliphatic hydroxycarboxylic acids which can be used in the invention include glycolic acid, lactic acid, 6-hydroxycaproic acid and cyclic esters of these aliphatic hydroxycarboxylic acids.

As to the combination of these constitutional ingredients, when the aliphatic polyester obtained is a crystalline polymer, the polymer has preferably a melting point of 25° C. or less. When the aliphatic polyester obtained is an amorphous polymer, the polymer preferably has a glass transition temperature of 25° C. or less. Representative combinations include, for example, aliphatic polyester prepared from diethylene glycol and a mixture of succinic acid and fumaric acid, aliphatic polyester prepared from triethylene glycol and a mixture of succinic acid and fumaric acid, aliphatic polyester prepared from diethylene glycol and a mixture of adipic acid and fumaric acid, and aliphatic polyester prepared from triethylene glycol and a mixture of adipic acid and fumaric acid.

Aliphatic polyester containing aliphatic unsaturated polybasic acid of the invention can be prepared by any process. For example, aliphatic polyester can be prepared by esterification of aliphatic polyhydric alcohol with aliphatic polybasic acid and a successive deglycolation reaction under high vacuum, or by reaction of aliphatic polyhydric alcohol with aliphatic polybasic acid in accordance with the preparation process of aliphatic polyester described in U.S. Pat. No. 5,401,796 or EP 0712880A2.

Alternatively, the aliphatic polyester can be prepared by conducting dehydration condensation of one or more ingredients (A) selected from the group consisting of (a1) aliphatic polyhydric alcohol and aliphatic unsaturated polybasic acid, (a2) aliphatic unsaturated oligoester and (a3) aliphatic unsaturated polyester with one or more ingredients (B) selected from the group consisting of (b1) aliphatic polyhydric alcohol and aliphatic saturated polybasic acid, (b2) aliphatic saturated oligoester and (b3) aliphatic saturated polyester, in the presence of a catalyst in an organic solvent.

A dehydration condensation process particularly in the presence of an organic solvent is advantageous in view of preparation equipment.

In the process, high molecular weight aliphatic polyester can be obtained by distilling out generated water and/or an excess monomer with the organic solvent out of the reaction system, while the reaction is conducted by charging an organic solvent to the reaction system as an additional solvent. The additional solvent contains less amount of water and/or the monomer than the amount of water and/or the monomer which are dissolved in the distilled organic solvent.

Organic solvents which can be used for the process include, for example, toluene, xylene, mesitylene and other hydrocarbon solvents; chlorobenzene, bromobenzene, iodobenzene, o-dichlorobenzene, p-dichlorobenzene, p-chlorotoluene, 1,1,2,2-tetrachloroethane and other halogenated solvents; 3-hexanone, acetophenone, benzophenone and other ketone based solvents; dibutyl ether, anisole, phenetole, o-dimethoxybenzene, p-dimethoxybenzene, 3-methoxytoluene, dibenzyl ether, benzyl phenyl ether, methoxynaphthalene and other ether based solvents; phenyl sulfide, thioanisole and other thioether based solvents; methyl benzoate, methyl phthalate, ethyl phthalate and other ester based solvents; diphenyl ether, alkyl substituted diphenyl ethers, halogen substituted diphenyl ethers, alkoxy substituted diphenyl ethers, cyclic diphenyl ethers and other diphenyl ether based solvents. Alkyl substituted diphenyl ethers include di(4-methylphenyl) ether, di(3-methylphenyl) ether, 3-phenoxytoluene and other alkyl substituted diphenyl ethers. Halogen substituted diphenyl ethers include di(4-bromophenyl) ether, di(4-chlorophenyl) ether, 4-bromophenylphenyl ether, 4-methyl-4'-bromodiphenyl ether and other halogen substituted diphenyl ethers. Alkoxy substituted diphenyl ethers include di(4-methoxyphenyl) ether, 4-methoxyphenylphenyl ether, di(3-methoxyphenyl) ether, 4-methyl-4'-methoxydiphenyl ether and other alkoxy substituted diphenyl ether. Cyclic diphenyl ethers include dibenzofuran, xanthene and other cyclic diphenyl ethers. These solvents can be used singly or as a mixture. Preferred solvents can be separated into layers from water with ease.

In order to obtain aliphatic polyester containing aliphatic unsaturated polybasic acid having a particularly high weight average molecular weight, halogenated solvediphenyl ether based solvents and diphenyl ether based solvents are more preferably used, and o-dichlorobenzene and diphenyl ether are most preferably used.

These solvents are preferably used in an amount so as to obtain a polymer concentration of 10–80%.

In order to distill generated water and/or excess monomer out of the reaction system in the process, it is preferred to distill the organic solvent in the form of an azeotropic mixture with water and/or the monomer. When the distilled organic solvent contains water and/or the monomer in an amount larger than the solubility of water and/or the monomer in the organic solvent, water and/or the monomer are removed from the organic solvent by separating into layers and the solvent can be successively returned to the reaction system.

In order to further remove water and the monomer which are dissolved in the organic solvent, the solvent is treated with a dehydrating agent or monomer removing agent or distilled to reduce the content of water and/or the monomer. Thereafter, the solvent can be returned to the reaction system. Alternatively, a fresh organic solvent having a low content of water and/or the monomer can be charged in place of the azeotropically distilled organic solvent.

Further, in the early stage of the reaction, the generated water and/or the excess monomer are removed under reduced pressure, successively the organic solvent is added, and a portion of the organic solvent is removed from the reaction mixture comprising the organic solvent to make the amount of water and/or the monomer in the reaction mixture a prescribed value.

That is, at least in a certain stage of the reaction, the condensation reaction proceeds while removing water and/or the monomer by using the solvent. As an embodiment thereof, the solvent may not form azeotropic mixture with water and/or the monomer, and may or may not separate into layers with water and/or the monomer. Further, as another embodiment, it is also included a method for previously charging the solvent in excess and conducting dehydration merely by extracting the solvent, and a method for drying the reaction solvent by using another solvent. As a modification of these methods, moisture can be removed while maintaining the reaction solvent itself in a liquid state as intact. As to the reaction temperature of the invention, the reaction has only to be carried out at a prescribed temperature even though the boiling point is reduced due to azeotropy of the solvent with water.

The average molecular weight of aliphatic polyester containing aliphatic unsaturated polybasic acid depends also upon the kind and the water and/or monomer content of the organic solvent which is charged to the reaction system.

When the solvent has a high moisture or monomer content of 400–500 ppm, the obtained aliphatic polyester containing aliphatic unsaturated polybasic acid has an weight average molecular weight of 10,000 or less. It is quite surprising that aliphatic polyester containing aliphatic unsaturated polybasic acid and having an weight average molecular weight of 15,000 or more can be obtained by using the diphenyl ether based solvent or o-dichlorobenzene even under a high moisture content or high monomer content as above. In order to obtain aliphatic polyester containing aliphatic unsaturated polybasic acid and having a still higher average molecular weight, the organic solvent charged to the reaction system desirably has a low content of water and the monomer. Accordingly, the azeotropically distilled organic solvent is treated with the dehydrating agent or the monomer removing agent and the resultant organic solvent having less or no content of water and/or the monomer is returned to the reaction system. Or a fresh organic solvent having a low moisture content is charged. Thus, aliphatic polyester containing aliphatic unsaturated polybasic acid and having an weight average molecular weight of 50,000 or more can be obtained by reducing the charging amount of water and/or the monomer to 50 ppm or less.

Exemplary dehydrating or monomer removing agents which can be used for preparing aliphatic polyester containing aliphatic unsaturated polybasic acid and having a high weight average molecular weight include, for example, molecular sieve 3A, molecular sieve 4A, molecular sieve 5A, molecular sieve 13X and other molecular sieves; alumina, silica gel, calcium chloride, calcium sulfate, diphosphorus pentoxide, concentrated sulfuric acid, magnesium perchlorate, barium oxide, calcium oxide, potassium hydroxide and sodium hydroxide; calcium hydride, sodium hydride, lithium aluminum hydride and other metal hydrides; and sodium and other alkali metals. In these agents, molecular sieves are preferred in view of ease in handling and recovery.

The reaction temperature in the process is preferably 80–200° C., more preferably 110–170° C. in view of polymer forming velocity and heat decomposition velocity of the formed polymer. The condensation reaction is usually carried out at the distillation temperature of the organic solvent under atmospheric pressure. When a high boiling point organic solvent is used in order to maintain the reaction temperature in a preferred range, the reaction can also be carried out under reduced pressure. When a low boiling point organic solvent is used, the reaction can be carried out under increased pressure.

The reaction can be carried out in the presence of or in the absence of a catalyst. The catalysts include metals, metal oxides and metal salts of the Group II, III, IV and V in the periodic table. Representative catalysts which can be used include, for example, zinc powder, tin powder, aluminum, magnesium, titanium, germanium and other metals; tin oxide, antimony oxide, zinc oxide, aluminum oxide, magnesium oxide, titanium oxide and other metal oxides; stannous chloride, stannic chloride, stannous bromide, stannic bromide, antimony fluoride, zinc chloride, magnesium chloride, aluminum chloride and other metal halogenides; tin sulfate, zinc sulfate, aluminum sulfate and other metal sulfates; magnesium carbonate, zinc carbonate and other metal carbonates; tin acetate, stannous octoate, zinc acetate, aluminum acetate and other organic carboxylic acid salts; tin trifluoromethane-sulfonate, zinc trifluoromethanesulfonate, magnesium trifluoromethane-sulfonate, tin methanesulfonate, tin p-toluenesulfonate and other organic sulfonates; dibutyl tin oxide and other organometal oxides of the above metals; titanium isopropoxide and other metal alkoxides of the above metals; diethyl zinc and other alkyl metals of the above metals; and Dawex, Amberilite and other ion exchange resins.

The amount of catalyst is preferably 0.0001–10% by weight, more preferably 0.001–2% by weight in view of economy for the total amount of aliphatic polyhydric alcohol and aliphatic polybasic acid or the amount of oligomer thereof.

The reaction is preferably carried out under inert gas atmosphere so as to prevent contamination of moisture from outside of the reaction system. The reaction can also be carried out while ventilating or bubbling the inert gas into the reaction system.

The method can progress the reaction while distilling generated water and/or the monomer with the organic solvent out of the reaction system. It is preferred to progress the reaction while distilling out the organic solvent with generated water and/or the monomer and simultaneously charging to the reaction system a fresh solvent having equal or less content of water and/or the monomer as compared with the amount dissolved in the distilled organic solvent. A preferable example of the embodiments using diethylene glycol with succinic acid and fumaric acid in a molar ratio of 9:1 for the raw materials will be described below.

To a reaction vessel equipped with a water separator, for example, Dean Stark trap, solvent and a prescribed amount of diethylene glycol, succinic acid, fumaric acid and a catalyst are charged and heated. Generated water is distilled into the water separator. Water which is present in excess of the solubility of the organic solvent is separated in the water separator and removed from the reaction system. The water saturated solvent remained is returned to the reaction system. In the step, diethylene glycol oligomerizes with succinic acid and fumaric acid. The weight average molecular weight in the step is 500–1,000 and can be up to about 5,000. The reaction time is from 0.5 hours to several hours. The oligomerization reaction can also be carried out previously in a separate reaction vessel in the absence of the solvent, in the absence of the catalyst, and under reduced pressure. The reaction can also be carried out by using the solvent in the absence of the catalyst. The reaction mixture is maintained as intact at the solvent distilling temperature. The reaction is continued while removing water which is generated with the progress of the reaction and returning the water saturated solvent to the reaction system. The polymer obtained after reacting for several hours has a weight average molecular weight of 15,000–50,000 depending upon the kind of the solvent. In order to obtain a polymer having a still higher molecular weight, the water separator is dismantled after distilling out almost all water in the raw materials and a tube packed with a drying agent such as molecular sieve is mounted so as to return the distilled solvent to the reaction system after passing through the tube, or the distilled solvent is treated in a separate reaction vessel containing the drying agent and successively returned to the reaction vessel, or a fresh solvent having a low moisture content is charged to the reaction vessel. The amount of water dissolved in the solvent is reduced to 50 ppm or less by these methods and the reaction is continued as intact for several dozens of hours. Thus obtained aliphatic polyester containing aliphatic unsaturated polybasic acid has a weight average molecular weight of 50,000–500,000 depending upon the kind of solvent. After finishing the reaction, the desired aliphatic polyester can be obtained by any treating method. For example, pyrophosphoric acid is added to the reaction mixture and the reaction mixture is heated, neutralized with calcium carbonate, hot filtered and concentrated to obtain desired aliphatic polyester containing aliphatic unsaturated polybasic acid.

Aliphatic polyester containing aliphatic unsaturated polybasic acid which is obtained by the process has an weight average molecular weight of 15,000–500,000 which is varied by changing the kind of the solvent, kind and amount of the catalyst, reaction temperature, reaction time and treating method of the azeotropically distilled solvent.

In the process, when the polycondensation reaction is carried out in the presence of the catalyst, the catalyst remaining in the polymer is liable to give an adverse effect on the heat stability and weatherability of the polymer. Accordingly, it is preferred to remove the catalyst in the polymer. A preferable method for removing the catalyst is to bring the reaction mixture of polycondensation into contact with an acid substance under stirring.

Exemplary acid substances which can be used include hydrochloric acid, sulfuric acid, nitric acid, pyrophosphoric acid, polyphosphoric acid and other inorganic acids; and acetic acid, p-toluene sulfonic acid and other organic acids. Cheap acids such as hydrochloric acid, sulfuric acid and nitric are preferably used, and pyrophosphoric acid and polyphosphoric acid are preferred in particular.

The amount of the acid substance is 0.0001–5.0 mols, preferably 0.001–1 mole for 100 parts by weight of the polymer. When the amount is less than 0.0001 mole, the catalyst removing effect becomes poor. On the other hand, an amount more than 5.0 moles leads to polymer deterioration problems.

The polymer is brought into contact with the acid substance preferably in the organic solvent, at a solid concentration of 3–40% by weight, and at a contact temperature of 60–160° C., more preferably 80–130° C., and a contact time of 0.1–24 hours, most preferably 0.5–5 hours.

Exemplary bases which can be used for neutralization include calcium carbonate, potassium carbonate, magnesium carbonate, sodium hydrogen carbonate, sodium carbonate and carbonate of other alkali metals and alkali earth metals. After finishing neutralization, insoluble matter is filtered off with precipitate of the catalyst.

Amount of the base is 1–10 molar equivalents, preferably 1–3 molar equivalents for the amount of the acid substance. When the amount is less than 1 mole, the acid substance remains and is liable to cause problems such as deterioration of the polymer.

Neutralization with the base is carried out under conditions similar to those for making the polymer into contact with the acid substance. The neutralization time is 0.1–2 hours, preferably 0.2–1 hours in particular.

The acid substance can be separated except neutralization treatment by adsorption on a solid carrier.

Representative solid carriers which can be used are mineral matters, inorganic oxides, ion exchange resins and other matters capable of adsorbing the acid substance, and include, for example, diatomaceous earth, bentonite, activated clay, zinc oxide, aluminum oxide, titanium oxide, magnesium silicate, calcium phosphate, silica gel, aluminosilica gel, activated carbon, zeolite, starch and cellulose. Diatomaceous earth, bentonite and activated clay are preferably used.

The amount of solid carrier is usually 0.5–100% by weight, preferably 1–30% by weight for the amount of the polymer. When the amount is less than 0.5% by weight, adsorption of the acid substance becomes insufficient and catalyst removing efficiency is impaired. On the other hand, an amount exceeding 100% by weight leads to problems such as application of load to the separation procedure of the solid carrier.

Adsorption can be carried out under sufficient contact of the acid substance with the solid carrier. The solid carrier is submerged in the aliphatic polyester solution and stirred usually for 10 minutes or more, preferably for 30 minutes or more.

No particular limitation is imposed upon the adsorption temperature to the solid carrier. The adsorption is usually carried out at the same temperature as the treatment with the acid substance. Further, the treatment can also be carried out by simultaneously charging the acid substance and the solid carrier within the above ranges of the amount. The procedure has also an advantage that the contact step of the acid substance and the adsorption step to the solid carrier can be carried out at the same time.

Alternatively, the acid substance adsorbed on the solid carrier in advance can be added to the reaction mixture, and treated similarly.

Aliphatic polyester containing aliphatic unsaturated polybasic acid of the invention can also be a product obtained by chain-extending aliphatic polyester prepared in the above methods with a linking reagent such as a diisocyanate compound.

The biodegradable elastomer of the invention can be prepared by crosslinking aliphatic polyester thus obtained which contains aliphatic unsaturated polybasic acid and has a weight average molecular weight of 15,000 or more. When the weight average molecular weight of aliphatic polyester is lower than 15,000, tackiness remains after crosslinking and an elastomer cannot be obtained.

As a process for crosslinking aliphatic polyester which contains aliphatic unsaturated polybasic acid, thermal polymerization by heating, photopolymerization by irradiation of ultraviolet rays and electron beam polymerization by irradiation of gamma rays can be employed.

No particular restriction is imposed upon the radical generating agent, that is, radical initiator in the thermal polymerization. Representative initiators which can be used include, for example, benzoyl peroxide, p-chlorobenzoyl peroxide, lauroyl peroxide, acetyl peroxide, di-tert-butyl peroxide, 1,1-tert-butylperoxy-3,3,5-trimethylcyclohexane, tert-butylperoxypivalate, tert-butylperoxy-2-ethylhexanoate, tert-butylperoxybenzoate, bis(4-tert-butylcyclohexyl) peroxydicarbonate, diisopropyl-peroxydicarbonate, tert-butylperoxy-isopropylcarbonate and other known peroxides; and azobisisobutyronitrile and other azo compounds. These initiators can be used singly or as a mixture.

The amount of these radical initiators is 0.005–5 parts by weight, preferably 0.01–3 parts by weight for 100 parts by weight of aliphatic polyester containing aliphatic unsaturated polybasic acid.

The temperature and time for curing by thermal polymerization process can be arbitrarily determined depending upon the radical initiator used and size of the cured product.

No particular restriction is imposed upon the radical generating agent, that is, sensitizer in the photopolymerization by irradiation of ultraviolet rays. Representative sensitizers which can be used include, for example, 4-phenoxydichloroacetophenone, 4-tert-butyl-dichloroacetophenone, 4-tert-butyl-trichloroacetophenone, diethoxyacetophenone,2-hydroxy-2-methyl-1-phenylpropane-1-one, 1-(4-dodecylphenyl)- 2-hydroxy-2-methylpropane-1-one, 1-hydroxycyclohexyl phenyl ketone, 2-methyl-1-[4-(methylthio)phenyl]-2-morpholinopropane-1, benzoin, benzoin methyl ether, benzoin ethyl ether, benzoin isopropyl ether, benzoin butyl ether, benzyldimethylketal, benzophenone, benzoylbenzoic acid, methyl benzoylbenzoate, 4-phenylbenzophenone, hydroxybenzophenone, 4-benzoyl-4'-methyldiphenyl sulfide, 3,3'-dimethyl-4-methyoxybenzophenone, thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropyl-thioxanthone, 1-phenyl-1,2-propanedione-2-(O-ethoxycarbonyl)oxime, 2,4,6-trimethylbenzoyldiphenylphosphine oxide, methylphenylglyoxylate, benzil, 9,10-phenanthrenequinone, camphorquinone, dibenzosuberone, 2-ethylanthraquinone, 4',4"-diethylisophthalophenone, and 3,3',4,4'-tetra(tert-butylperoxycarbonyl)benzophenone. These sensitizers can be used singly or as a mixture.

The sensitizers are used in an amount of 0.005–5 parts by weight, preferably 0.01–3 parts by weight for 100 parts by weight of aliphatic polyester containing aliphatic unsaturated polybasic acid.

Further, the above sensitizers can also be used in combination with the radical initiators described above. Polymerization by irradiation of gamma rays does not require the radical initiators.

The aliphatic polyester resin thus crosslinked has rubber-like elasticity, is 80 or less in hardness which is evaluated in accordance with ASTM D 676-58T, has an elastic modulus from $1 \times 10^5$ Pa to $1 \times 10^8$ Pa at 25° C., and is a biodegradable elastomer which can decompose with ease in the natural environment, under composting conditions or under hydrolysis conditions.

The biodegradable elastomer of the invention can be applied to various uses. When necessary, reinforcing agent, filler, plasticizer, mold releasing agent, thickner and coloring agent can be simultaneously used.

Filler is incorporated in order to make processing ability of the biodegradable elastomer of the invention easy and further to improve properties for special uses. Fillers which can be mainly used are inorganic compounds and include, for example, calcium carbonate, clay, talc, diatomaceous earth, kaolin, activated calcium fluoride, alumina white, aluminum sulfate, barium sulfate, calcium sulfate, graphite, glass fiber, and asbestos. Organic material can also be used as a bulking filler. Organic materials which can be used for such purpose include, for example, cellulose powder, reclaimed rubber, ebonite powder, ceramic, wood powder, coconut shell flour, cork powder, cotton linter and rubber powder.

The crosslinked aliphatic polyester resin of the invention can be applied to various uses. The shape of the product for practical use can be provided by cutting into a desired shape after crosslinking or by pouring the green stock of the resin into a mold and carrying out crosslinking in the mold.

The biodegradable elastomer of the invention can be used as a substitute for general purpose resin, for example, for tire, wire and cable covering, packing, rubber vibration insulator, belt, soling material, rubber tile, rubber shoes, rubberized fabric, rubber hose, rubber thread, rubber tube, rubber sponge, foamed rubber, rubber roll, rubber lining, sealing material, foamed article, rubber net, diaper holder, balloon and fishing articles.

EXAMPLE

The present invention will hereinafter be illustrated by way of examples. However, these examples are not construed to limit the scope of the invention. These examples are evaluated by the methods described below.

(1) Weight average molecular weight

The weight average molecular weight (MW) of unsaturated polyester was measured by gel permeation chromatography using chloroform solvent at a column temperature of 40° C. Polystyrene standard sample was used as reference.

(2) Moisture content of solvent

Measured with a Karl Fisher's moisture meter: MKC-210, manufactured by Kyoto Densi Kogyo Co.

(3) Ultraviolet curing

Measured with an EYE ultraviolet curing apparatus manufactured by Iwasaki Denki Co.

Top irradiation 107mW/cm$^2$, Bottom irradiation 102mW/cm$^2$

Energy corresponds to 12540 mJ/cm$^2$/60sec.

(4) Differential thermal analysis

Measured with a differential scanning calorimeter: DSC-3100, manufactured by Mac. Science Co. in the temperature range of −100° C.–230° C.

(5) Hardness

Measured in accordance with ASTM D 676–58T.

(6) Viscoelasticity

Measured with a viscoelasticity analyzer: RSA-II, manufactured by Rheometric Scientific Co.

Measuring condition:

Measuring jig: Parallel plate compression of 4.78 mmφ

Number of cycles: w=6.28 rad/s=1 Hz

Temperature: −70–200° C.

Test mode: Temperature Ramp Test (7) Degradability

A film was buried in a compost at room temperature for 30 days. Degradability was evaluated by measuring tensile strength before and after the burying.

Example 1

To a mixture of 106.1 g of diethylene glycol, 106.3 g of succinic acid and 11.6 g of fumaric acid, 0.94 g of stannous oxide was added, and oligomerization was carried out by heating the resulting mixture with stirring under nitrogen ventilation at 150° C./1 atm for 2.5 hours and successively at 150° C./15 mmHg for 0.5 hours while distilling water out of the reaction system. To the oligomer mixture, 464 g of o-dichlorobenzene was added and a tube packed with 40 g of molecular sieve 5A was mounted so as to return the distilled solvent to the reaction system after passing through the molecular sieve layer. Thereafter, the reaction was continued at 140° C./250 mmHg for 20 hours. To the reaction mass, 660 g of o-dichlorobenzene and 10 g of pyrophosphoric acid were added and stirred at 110° C. for 2 hours. Thereafter, the reaction mixture was neutralized with 22.5 g of calcium carbonate and hot filtered.

The filtrate was concentrated under reduced pressure by distilling off the solvent to obtain the polymer.

The polymer thus obtained had a weight average molecular weight of 179,000 and a glass transition temperature of −25.0° C. by differential thermal analysis.

Preparation of a Sample

To 10 g of the polymer obtained, 20 mg of an initiator: 1-phenyl-2-hydroxy-2-methylpropane-1-one was added. The mixture was put on a glass Petri dish having a diameter of 20 mm and cured by irradiating with an EYE ultraviolet curing apparatus.

Measurement of Hardness

Hardness of the sample was measured at sample thickness of 12 mm or more in accordance with ASTM D 676-58T.

Irradiation time and hardness values are illustrated in Table 1.

TABLE 1

| Irradiation (sec) | 20 | 60 | 120 | 360 | 600 |
|---|---|---|---|---|---|
| Energy (mJ/cm$^2$) | 4180 | 12540 | 25080 | 75340 | 125400 |
| Hardness | 50 | 45 | 52 | 64 | 61 |

Viscoelasticity

A cured sample was measured with a viscoelasticity analyzer: RSA-11. A measured chart is shown in FIG. 1.

Degradability

The sample was sliced into a film and degradability was evaluated. The film was severely degraded and strength could not be measured after degradation.

Example 2

To a mixture of 106.1 g of diethylene glycol, 115.7 g of succinic acid and 2.4 g of fumaric acid, 0.94 g of stannous oxide was added, and oligomerization was carried out by heating the resulting mixture with stirring under nitrogen ventilation at 150° C./1 atm for 2.5 hours and successively at 150° C./15 mmHg for 0.5 hour while distilling water out of the reaction system. To the oligomer mixture, 464 g of o-dichlorobenzene was added and a tube packed with 40 g of molecular sieve 5A was mounted so as to return the distilled solvent to the reaction system after passing through the molecular sieve layer. Thereafter, the reaction was continued at 140° C./250mmHg for 18 hours. To the reaction mass, 660 g of o-dichlorobenzene and 10 g of pyrophosphoric acid were added and stirred at 110° C. for 2 hours. Thereafter, the reaction mixture was neutralized with 22.5 g of calcium carbonate and hot filtered.

The filtrate was concentrated under reduced pressure by distilling off the solvent to obtain the polymer.

The polymer thus obtained had an weight average molecular weight of 138,000 and a glass transition temperature of −26.0° C. by differential thermal analysis.

Preparation of a Sample

To a 10 g of the polymer obtained, 20 mg of an initiator: 1-phenyl-2-hydroxy-2-methylpropane-1-one was added. The mixture was put on a glass Petri dish having a diameter of 20 mm and cured by irradiating with an EYE ultraviolet curing apparatus.

Measurement of Hardness

Hardness of the sample was measured at sample thickness of 12 mm or more in accordance with ASTM D 676-58T.

Irradiation time and hardness values are illustrated in Table 2.

TABLE 2

| Irradiation (sec) | 60 | 120 | 240 |
|---|---|---|---|
| Energy (mJ/cm$^2$) | 12540 | 25080 | 37620 |
| Hardness | 26 | 28 | 27 |

Degradability

The sample was sliced into a film and degradability was evaluated. The film was severely degraded and strength of the film could not be measured after degradation.

Example 3

To a mixture of 106.1 g of diethylene glycol, 131.6 g of adipic acid and 11.7 g of fumaric acid, 0.94 g of stannous oxide was added, and oligomerization was carried out by heating the resulting mixture with stirring under nitrogen ventilation at 150° C./1 atm for 2.5 hours and successively at 150° C./15 mmHg for 0.5 hour while distilling water out of the reaction system. To the oligomer mixture, 464 g of o-dichlorobenzene was added and a tube packed with 40 g of molecular sieve 5A was mounted so as to return the distilled solvent to the reaction system after passing through the molecular sieve layer. Thereafter, the reaction was continued at 140° C./250 mmHg for 28 hours. To the reaction mass, 660 g of o-dichlorobenzene and 10 g of pyrophosphoric acid were added and stirred at 110° C. for 2 hours. Thereafter, the reaction mixture was neutralized with 22.5 g of calcium carbonate and hot filtered.

The filtrate was concentrated under reduced pressure by distilling off the solvent to obtain the polymer.

The polymer thus obtained had an weight average molecular weight of 45,000 and a glass transition temperature of –47.0° C. by differential thermal analysis.

Preparation of a Sample

To a 10 g of the polymer obtained, 20 mg of an initiator: 1-phenyl-2-hydroxy-2-methylpropane-1-one was added. The mixture was put on a glass Petri dish having a diameter of 20 mm and cured by irradiating with an EYE ultraviolet curing apparatus.

Measurement of Hardness

Hardness of the sample was measured at sample thickness of 12 mm or more in accordance with ASTM D 676-58T.

Irradiation time and hardness values are illustrated in Table 3.

TABLE 3

| Irradiation (sec) | 60 | 120 | 240 |
|---|---|---|---|
| Energy (mJ/cm$^2$) | 12540 | 25080 | 37620 |
| Hardness | 29 | 28 | 30 |

Degradability

The sample was sliced into a film and degradability was evaluated. The film was severely degraded and strength of the film could not be measured after degradation.

Comparative Example 1

To a mixture of 106.1 g of diethylene glycol, 106.3 g of succinic acid and 11.6 g of fumaric acid, 0.94 g of stannous oxide was added, and oligomerization was carried out by heating the resulting mixture with stirring under nitrogen ventilation at 150° C. /1 atm for 2.5 hours and successively at 150° C./15 mmHg for 0.5 hour while distilling water out of the reaction system.

To the oligomer mixture, 464 g of o-dichlorobenzene was added and a tube packed with 40 g of molecular sieve 5A was mounted so as to return the distilled solvent to the reaction system after passing through the molecular sieve layer. Thereafter, the reaction was continued at 140° C./250 mmHg for 6 hours. The solvent had moisture content of 2 ppm after passing through the molecular sieve layer.

To the reaction mass, 660 g of o-dichlorobenzene and 10 g of pyrophosphoric acid were added and stirred at 110° C. for 2 hours. Thereafter, the reaction mixture was neutralized with 22.5 g of calcium carbonate and hot filtered.

The filtrate was concentrated under reduced pressure by distilling off the solvent to obtain the polymer.

The polymer thus obtained had a weight average molecular weight of 14,000 and a glass transition temperature of –24.0° C. by differential thermal analysis.

Preparation of a Sample

A sample was prepared by carrying out similar procedures as Example 1, and cured by irradiating with the same ultraviolet curing apparatus as used in Example 1. However, tackiness was remained on the sample and hardness could not be measured.

Example 4

To a mixture of 150.2 g of triethylene glycol. 131.6 g of adipic acid and 11.7 g of fumaric acid, 0.94 g of stannous oxide was added, and oligomerization was carried out by heating the resulting mixture with stirring under nitrogen ventilation at 150° C./1 atm for 2.5 hours and successively at 150° C./15 mmHg for 0.5 hour while distilling water out of the reaction system. To the oligomer mixture, 464 g of o-dichlorobenzene was added and a tube packed with 40 g of molecular sieve 5A was mounted so as to return the distilled solvent to the reaction system after passing through the molecular sieve layer. Thereafter, the reaction was continued at 140° C./250 mmHg for 25 hours. The solvent had moisture content of 2 ppm after passing through the molecular sieve layer.

To the reaction mass, 660 g of o-dichlorobenzene and 10 g of pyrophosphoric acid were added and stirred at 110° C. for 2 hours. Thereafter, the reaction mixture was neutralized with 22.5 g of calcium carbonate and hot filtered.

The filtrate was concentrated under reduced pressure by distilling off the solvent to obtain the polymer.

The polymer thus obtained had a weight average molecular weight of 146,000 and a glass transition temperature of -48.0° C. by differential thermal analysis.

Preparation of a Sample (1) (Photo-curing)

A sample was prepared by carrying out similar procedures as Example 1 and subjected to photo-curing according to similar procedures as Example 1.

Preparation of a Sample (2) (Heat-curing)

To 10 g of the polymer obtained, 20 mg of an initiator (tert-butyl peroxide) was added and placed in a glass Petri dish having a diameter of 20 mm. The mixture was thoroughly milled with a spatula, deaerated at 60° C. for 30–60 minutes in a drying oven, and cured in a drying oven at 100° C. for 60 minutes.

Hardness Measurement

Hardness of the sample was measured in accordance with ASTM D 676-58T at sample thickness of 12 mm or more. Hardness of sample (1) and sample (2) were 30 and 26, respectively.

Degradability

The samples were sliced into a film and degradability was evaluated. The film was severely degraded and strength of the film could not be measured after the degradation test.

Example 5

To a mixture of 150.2 g of triethylene glycol, 141.8 g of adipic acid and 3.5 g of fumaric acid, 0.94 g of stannous oxide was added, and oligomerization was carried out by heating the resulting mixture with stirring under nitrogen ventilation at 150° C./1 atm for 2.5 hours and successively at 150° C./15 mmHg for 0.5 hour while distilling water out of the reaction system. To the oligomer mixture, 464 g of o-dichlorobenzene was added and a tube packed with 40 g of molecular sieve 5A was mounted so as to return the distilled solvent to the reaction system after passing through the molecular sieve layer. Thereafter, the reaction was continued at 140° C./250mmHg for 31 hours. The solvent had moisture content of 2 ppm after passing through the molecular sieve layer.

To the reaction mass, 660 g of o-dichlorobenzene and 10 g of pyrophosphoric acid were added and stirred at 110° C. for 2 hours. Thereafter, the reaction mixture was neutralized with 22.5 g of calcium carbonate and hot filtered.

The filtrate was concentrated under reduced pressure by distilling off the solvent to obtain the polymer.

The polymer thus obtained had a weight average molecular weight of 50,000 and a glass transition temperature of −32.7° C. by differential thermal analysis.

Preparation of a Sample (Heat-curing)

A sample was prepared by carrying out the same procedures as described in Example 4, Preparation of a sample (2).

Hardness Measurement

Hardness of the sample was measured in accordance with ASTM D 676-58T at sample thickness of 12 mm or more.

Hardness of the sample was 36.

Degradability

The sample was sliced into a film and degradability was evaluated. The film was severely degraded and strength of the film could not be measured after the degradation test.

What is claimed is:

1. A process for preparing a biodegradable aliphatic polyester elastomer comprising crosslinking an aliphatic polyester containing an aliphatic saturated polybasic acid and an aliphatic unsaturated polybasic acid as polymer constituting ingredients wherein said aliphatic unsaturated polybasic acid is present in an amount of 0.1 to 20% of the total molar amount of aliphatic polybasic acid used and wherein the aliphatic polyester containing an aliphatic saturated polybasic acid and an aliphatic unsaturated polybasic acid has a weight average molecular weight of 15,000 or more and is an amorphous polymer having a glass transition temperature of 25° C. or less or a crystalline polymer having a melting point of 25° C. or less and wherein the biodegradable aliphatic polyester elastomer has a hardness of 80 or less as determined by ASTM D676-58T.

2. The process of claim 1, wherein the aliphatic polyester containing the aliphatic unsaturated polybasic acid is prepared by conducting a heat dehydration reaction of one or more ingredients (A) selected from the group consisting of:
   (a1) aliphatic polyhydric alcohol and aliphatic unsaturated polybasic acid,
   (a2) aliphatic unsaturated oligoester, and
   (a3) aliphatic unsaturated polyester,
with one or more ingredients (B) selected from the group consisting of:
   (b1) aliphatic polyhydric alcohol and aliphatic saturated polybasic acid,
   (b2) aliphatic saturated oligoester, and
   (b3) aliphatic saturated polyester,
in an organic solvent, in the presence of a catalyst, while removing from the reaction mixture a portion of the organic solvent comprising generated water and/or excess monomer and charging to the reaction mixture an additional organic solvent having a less or equal content of moisture and/or the monomer as compared with the organic solvent removed.

3. The process of claim 1, wherein the aliphatic unsaturated polybasic acid is one or more ingredients selected from the group consisting of fumaric acid, maleic acid, itaconic acid, citraconic acid and anhydrides of these acids.

4. The process of claim 1, wherein the aliphatic polyester comprises an ethylene glycol polymer represented by the formula (1);

$$\text{HO}-(-\text{CH}_2\text{CH}_2\text{O}-)_n-\text{H} \tag{1}$$

wherein n is an integer of 2–10.

5. The process of claim 4, wherein n is an integer of 2 or 3.

6. The process of claim 1, wherein the crosslinking is conducted by thermal polymerization.

7. The process of claim 1, wherein the crosslinking is conducted by photo polymerization.

8. A biodegradable aliphatic elastomer which is obtained by crosslinking an aliphatic polyester containing an aliphatic saturated polybasic acid and an aliphatic unsaturated polybasic acid as polymer constituting ingredients, wherein said aliphatic unsaturated polybasic acid is present in an amount of 0.1 to 20% of the total molar amount of aliphatic polybasic acid used and wherein the aliphatic polyester containing an aliphatic saturated polybasic acid and an aliphatic unsaturated polybasic acid has a weight average molecular weight of 15,000 or more, and is an amorphous polymer having a glass transition temperature of 25° C. or less or a crystalline polymer having a melting point of 25° C. or less and wherein the biodegradable aliphatic polyester elastomer has a hardness of 80 or less as determined by ASTM D676-58T.

9. The biodegradable aliphatic elastomer polyester of claim 8, wherein the aliphatic polyester containing an aliphatic unsaturated polybasic acid is prepared by conducting a heat dehydration reaction of one or more ingredients (A) selected from the group consisting of:
   (a1) aliphatic polyhydric alcohol and aliphatic unsaturated polybasic acid,
   (a2) aliphatic unsaturated oligoester,
   (a3) aliphatic unsaturated polyester,
with one or more ingredients (B) selected from the group consisting of:
   (b1) aliphatic polyhydric alcohol and aliphatic saturated polybasic acid, (b2) aliphatic saturated polyester,
in an organic solvent, in the presence of a catalyst, while removing from the reaction mixture a portion of the organic solvent comprising generated water and/or excess monomer and charging to the reaction mixture an additional organic solvent having a less or equal content of moisture and/or the monomer as compared with the organic solvent removed.

10. The biodegradable aliphatic polyester elastomer of claim 8 wherein the aliphatic polyester comprises an ethylene glycol polymer represented by the formula (1);

$$HO\text{—}(\text{—}CH_2CH_2O\text{—})_n\text{—}H \tag{1}$$

wherein n is an integer of 2–10.

11. The biodegradable aliphatic polyester elastomer of claim 8 wherein the aliphatic polyhydric alcohol is an ethylene glycol polymer represented by the formula (1);

$$HO\text{—}(\text{—}CH_2CH_2O\text{—})_n\text{—}H \tag{1}$$

wherein n is an integer of 2–10.

12. The biodegradable aliphatic polyester elastomer of claim 8 wherein, the biodegradable elastomer has an elastic modulus from $1\times10^5$ Pa to $1\times10^8$ Pa at 25° C.

* * * * *

UNITED STATES PATENT AND TRADEMARK OFFICE
CERTIFICATE OF CORRECTION

PATENT NO. : 6,001,891
DATED : December 14, 1999
INVENTOR(S) : Chojiro Higuchi et al.

It is certified that error appears in the above-identified patent and that said Letters Patent is hereby corrected as shown below:

Section [30],
Change "Jun. 16, 1996" to -- Jun. 14, 1996 --.

Column 18,
Line 3, delete "claim 8" and insert -- claim 9 --.

Signed and Sealed this

Second Day of October, 2001

*Attest:*

*Attesting Officer*

NICHOLAS P. GODICI
*Acting Director of the United States Patent and Trademark Office*